United States Patent [19]

Segers et al.

[11] 4,435,806

[45] Mar. 6, 1984

[54] DEVICE FOR TESTING A CIRCUIT COMPRISING SEQUENTIAL AND COMBINATORIAL LOGIC ELEMENTS

[75] Inventors: Marinus T. M. Segers; Cornelis Niessen; Krijn Kuiper, all of Eindhoven, Netherlands

[73] Assignee: U.S. Philips Corporation, New York, N.Y.

[21] Appl. No.: 282,625

[22] Filed: Jul. 13, 1981

[30] Foreign Application Priority Data

Jul. 21, 1980 [NL] Netherlands ................. 8004176

[51] Int. Cl.³ ........................................... G01R 31/28
[52] U.S. Cl. ........................... 371/25; 324/73 R; 371/27
[58] Field of Search ............... 371/25, 27; 324/73 R, 324/73 AT

[56] References Cited

U.S. PATENT DOCUMENTS

| | | | |
|---|---|---|---|
| 3,582,633 | 6/1971 | Webb | 371/25 |
| 3,739,160 | 6/1973 | El-Hasan et al. | 371/25 |
| 3,761,695 | 9/1973 | Eichelberger | 371/25 |
| 3,924,181 | 12/1975 | Alderson | 324/73 R |
| 4,176,780 | 12/1979 | Sacher et al. | 371/25 |
| 4,285,059 | 8/1981 | Burlage et al. | 371/25 |
| 4,317,200 | 2/1982 | Wakatsuki et al. | 371/25 |

OTHER PUBLICATIONS

H. J. Nadig, Testing a Microprocessor Product Using a Signature Analysis, 1978 Semiconductor Test Conference, Cherry Hill, N.J., Oct.-Nov. 1978, pp. 159-169.

*Primary Examiner*—Charles E. Atkinson
*Attorney, Agent, or Firm*—James J. Cannon, Jr.

[57] ABSTRACT

A device for processing digital signals includes combinatorial and sequential logic elements. For the testing of the device, a shift register can be formed from the sequential elements. A test pattern is applied thereto. The result of the processing of the test pattern is applied to the shift register. The output of the shift register is connected to a second shift register which forms a moving multibit sum pattern from a received series of result patterns by way of a feedback circuit to at least one Exclusive-OR-element. An output of the feedback circuit is connected to an input of the first shift register in order to apply a subsequent test pattern thereto. After completion of the test, the sum pattern formed is checked.

4 Claims, 1 Drawing Figure

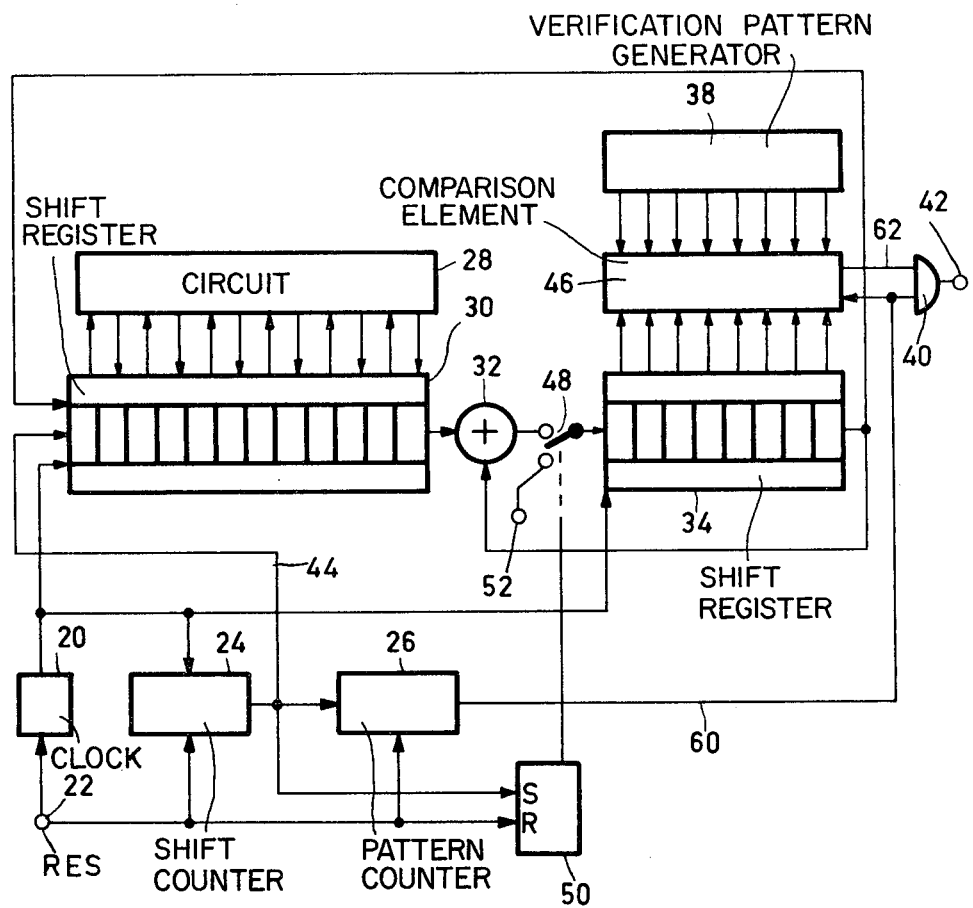

DEVICE FOR TESTING A CIRCUIT COMPRISING SEQUENTIAL AND COMBINATORIAL LOGIC ELEMENTS

BACKGROUND OF THE INVENTION

1. Field of the Invention

The invention relates to a device for the processing of digital signals by means of combinatorial and sequential logic elements, it being possible to form a first shift register from said sequential elements for the testing of the device, said shift register comprising a first series input, a first series output, a first parallel output for applying a data pattern stored to further elements of the circuit for processing, and a first parallel input for subsequently receiving a result pattern of said processing, a test pattern generator being connected to said first series input while a verification device is connected to said first series output. In a combinatorial logic element, a change of an input signal may or may not signify a change of an output signal, but independent of the instant at which said change occurs. In a sequential logic element, given memory functions are represented: one or more internal conditions of the element have a given persistence. Depending on the input signals and on the internal condition itself, these conditions cannot always be directly changed (they can be changed, for example, when a next clock pulse period commences, after a given delay, etc).

2. Description of the Prior Art

A device of the described kind is known from an article by M. J. Y. Williams and J. B. Angell, "Enhancing testability of large-scale integrated circuits via test points and additional logic", IEEE, Tr. Computers, Vol. C22, Jan. 1973, pages 46-60. As a result of this technique, the sequential elements of the first shift register can assume a well-defined starting condition. In given cases the complete verification of a long data pattern represents a complex problem; therefore, a result pattern of long length is advantageously converted into a secondary pattern of smaller length. If a deviation occurs in the result pattern, the nature of the fault can in many cases be detected in the circuit. The latter information is not always relevant, for example, when products just finished are tested. In that case the information "good"/"bad" usually suffices and this information is usually still present in the secondary pattern. For the testing of a circuit, often a number of test patterns are used which each produce their own result pattern. The design of such a series of test patterns is a complex matter because the different test patterns preferably serve also to test different sub-functions of the circuit. Furthermore, the evaluation of a large number of result patterns is a time consuming matter. However, the number of test patterns must still be comparatively large in many cases; because if the number is too small, defective circuits will often be accepted erroneously.

SUMMARY OF THE INVENTION

It is an object of the invention to enable simple testing of a device of the described kind, while the risk of errors remaining undetected is still small. The object is achieved in accordance with the invention in that the verification device comprises a second shift register with a second series input and a second series output, said second series input being coupled to the first series output, the second shift register comprising a feedback circuit from the second series output in order to cyclically update a moving multibit sum pattern of the successively received result patterns by means of at least one Exclusive-OR element, said first series input being connected to an output of said feedback circuit in order to realize said test pattern generator, an output of said second shift register being connected to a comparison element, together with an output of a verification pattern generator, said first and second shift regisers comprising means for receiving an initial signal pattern before the start of a test. Preferably, the verification device comprises an activation input for receiving an activation signal at the end of a test. The length of the second shift register may be limited; in any case, it may be substantially smaller than that of the first shift register. As a result, the verification is simple. Furthermore, the formation of a moving sum pattern by means of a feedback with Exclusive-OR-function is advantageous: as a result, a series of test patterns which are mutually pseudo-independent are thus formed from a single initial test pattern; it has been found that a large number of errors can be quickly detected by means of a series of test patterns thus formed.

Furthermore, said feedback circuit preferably consists of a single Exclusive-OR-gate which receives the output signals of the first and the second shift register. This results in a very simple realization. However, it is alternatively possible to provide additional feedbacks, for example, in the manner of a shift register that is adapted to generate a so-called "maximum length bit series".

BRIEF DESCRIPTION OF THE DRAWING

The invention will be described in detail with reference to a single FIGURE. This FIGURE shows a block schematic diagram of a circuit testing device in accordance with the invention.

DESCRIPTION OF THE PREFERRED EMBODIMENT

The circuit to be tested comprises combinatorial and sequential logic elements. In the present embodiment, all sequential logic elements can be combined in the 12-bit shift register 30. In many cases a circuit to be tested will comprise a much larger number of stages which are to be combined in order to form a shift register: the number may be completely arbitrary. The block 28 represents the remainder of the circuit to be tested, so combinatorial logic elements and possibly further sequential logic elements which are not included in the shift register 30. The latter elements can then be initiated in a different manner, for example, by means of a known reset signal. The circuit to be tested consists of the sections 28 and 30. This circuit may have an arbitrary function. The realization may be as a separate integrated circuit, a combination of integrated circuits, or a hybrid circuit, the assembly being accommodated, for example, in a module of the type DIP. On the other hand, the realization may also be a printed circuit board on which there are provided a number of integrated circuits and possibly discrete components. The test circuit to be described hereinafter may be combined with the sections 28, 30; however, in that case the signal input to or the signal output from the circuit cannot be fully tested. In many cases, therefore, the test circuit annex verification device will be a separate device which is capable of testing a variety of circuits; this test unit then forms part of a manufacturing process. At the beginning of the test, the first test pattern is loaded into the shift register 30. This is realized as follows:

At the beginning of the test, a reset signal appears which is presented, for example, manually to the terminal 22. As a result, flipflop 50 is set to a first position for driving the switch 48 to the lower position. Furthermore, a shift counter 24 and a pattern counter 26 are reset to the starting position (0). The signal of terminal 52 then appears on the input of shift register 34. This signal may concern a series of code bits, but it may alternatively be a fixed value, so continuously "0" or "1". If necessary, the reset signal may also activate a clock 20. In another embodiment, this may be a free-running clock. The shift counter 24 has twenty positions (the sum of the number of bit stages of the shift registers 30 and 34) and is suitable for continuous counting under the control of the clock 20. The counter 24 supplies an output carry signal on line 44 each time after having been switched through twenty positions. The shift register 30 is composed of known master/slave stages. When the carry output signal on line 44 is absent, the information is taken up in the master section of the flipflops during one half of the clock pulse period; during the other half of the clock pulse period, the information is taken up in the next slave section of the flipflops. This shift register thus comprises twelve master stages and twelve slave stages. The information of terminal 52 is thus shifted into the series connected shift registers 34 and 30 via the switch 48 during the first twenty clock periods. In all these positions, the content of the shift register 30 is also presented to the circuit 28. For the sake of simplicity, only six connections are shown. The output signals of the circuit 28 are also presented to the relevant stages of the shift register; for the sake of simplicity, again only six connections are shown. For as long as the carry signal on the line 44 is absent, the output signals of the circuit 28 are not taken up. When the position 20 is reached, the output carry signal of counter 24 appears for one half clock pulse period. This signal controls the shift register 30 so that the output information of the circuit 28 is taken up instead of that of the preceding master or slave stage. If necessary, (not indicated), a synchronizing clock pulse is also applied to the circuit 28. The carry signal on the line 44 is also applied to the pattern counter 26 and to the flipflop (set/reset flipflop) 50. The pattern counter 26 counts each time one step further. The flipflop 50 is switched over in reaction to the first reception of the output carry signal of the counter 24; the switch 48 remains in the upper position for the remainder of the test. The shift registers 30 and 34 are thus coupled end-around. Contrary to the foregoing, it is alternatively possible for the supply of the test pattern to the circuit 28 and the reception and storage of the result pattern to be controlled by an additional clock pulse.

Under the control of each subsequent series of 20 clock pulse periods, a test pattern is thus stored in the shift register 30, after which it is applied to the circuit 28 and the result pattern is stored again.

The output of the shift register 34 is then fed-back to its own input via EXCLUSIVE-OR gate 32. This means that the content of the shift register 34 is determined by all results of the test patterns applied to the circuit 28. If a bit of a result was incorrect due to a defect, it remains detectable as such in the content of the shift register 34. If more bit errors occur, they could compensate for each other. However, the risk that a defective circuit 28 still generates the correct content in the shift register 34 after the processing of a large number of test patterns is in principle very small. In a fully stochastic case with a length of the shift register 34 of 8 bits, this risk is only 1:28. For each cycle of 20 clock pulses, the position of the pattern counter 26 is thus incremented. In a predetermined counter position, an output carry signal then appears on line 60 in order to indicate that the test operation has been completed. The circuit furthermore comprises a verification pattern generator 38. This is, a register which can be manually loaded. It contains as much information as the shift register 34, in this example 8 bits, which can be applied in parallel to the comparison element 46 as shown in the FIGURE. The latter element receives the 8 bits of the shift register 34 in the same manner and performs a bit-wise comparison on the 8+8 bits received. It is activated by the output carry signal on the line 60. If all 8 bit pairs produce correspondance, the comparison device 46 supplies a logic "1" which is applied to the AND-gate 40, together wih the output carry signal on the line 60. If this gate supplies a "1", the circuit to be tested is in order. Therefore, the signals on the lines 60 and 62 must be coexistent. The output signal on the line 42 can be used in a variety of ways. It may be stored in a set/reset flipflop which is biased by the signal on the terminal 60. Two signal lamps on the outputs of this flipflop then indicate "good" and "bad". On the other hand, the element 40 itself may also be a set/reset flipflop which is set by the signal on the line 60. If the circuit is in order, the flipflop is reset by the signal on the line 62 which then arrives slightly later. To line 42 there is to be connected an element which detects the resetting in order to indicate a correct circuit. It is alternatively possible for the comparison to be continuously performed in the element 46: in that case the activation signal on the line 60 need not be supplied. The signal on the line 60 may also be used for stopping the clock 20 (not indicated).

The signal pattern in the verification pattern generator can be formed on the basis of a suitable reference circuit; this may be a circuit which has been tested in a conventional manner. A further possibility of generating the verification pattern consists in the simulation on a computer (which describes the circuit as a set of logic functions). The ratio of the length of the shift registers 30/34 may be arbitrary. For the element 34, a length of eight bits often suffices, but sixteen bits may also be advantageous (the shift register 30 is usually two or three times longer than the shift register 34: the described test system is particularly suitable for complex circuits). Instead of the single Exclusive-OR-gate 32 use can be made of several fed back gates between the stages, as is customary for "maximum length shift registers". It is alternatively possible to realize the supply of information to the shift register 30 from the output of the Exclusive-OR gate 32 instead of from the shift register 34 (but in such a case the information is obtained from the output side of switch 48). This is particularly advantageous if the shift register 34 comprises a special reset input. The test can then be performed more quickly, because each cycle requires only twelve clock pulse periods. The gain in practical cases is much smaller, for example, a factor 128/136. The comparison in element 46 can be serially performed instead of in parallel. If an initial test pattern of all "0" signals is advantageous, it can be realized by means of reset inputs on the registers 30, 34, in which case the switch 48 can be dispensed with. The test method can be attractively used for dynamic MOS logic.

What is claimed is:

1. A digital signal processing device comprising a plurality of binary storage elements provided with control means to constitute a first shift register; said shift register having a first series input for receiving a test pattern, a first parallel output connected to signal processing elements in the device for presenting thereto said test pattern, a first parallel input connected to said signal processing elements for receiving therefrom a result pattern, and a first series output for outputting said result pattern; said digital signal processing device comprising a second shift register, said second shift register having a second serial output feeding said first serial input and feedback means; said feedback means comprising a retrocoupled connection for effecting an EXCLUSIVE-Or-function with at least one stage input of said second shift register; said second shift register having a verification output for feeding a verification means; and wherein said first and second shift registers have initializing means for receiving an initial signal pattern before the start of a test.

2. A device as claimed in claim 1, characterized in that the comparison element comprises an activation input (60) for receiving an activation signal at the end of a test.

3. A device as claimed in claim 1 or 2, characterized in that said feedback circuit consists of a single Exclusive-OR-gate which receives the serial output signal of the first and the second shift register.

4. A method for testing a digital signal processing device comprising a plurality of binary storage elements and signal processing elements, said method comprising the steps of:

a. providing an initial signal pattern for initializing all of said plurality of binary storage elements;
 b. presenting the contents of said plurality of binary storage elements in parallel to said signal processing elments for processing therein;
 c. presenting the results of said processing in said signal processing elements in parallel to said plurality of binary storage elements for storage therein, and forming an intermediate shift register from said binary storage elements;
 d. serially presenting the contents of said plurality of binary storage elements to a result shift register while retrocoupling at least one bit position output of said result shift register for exclusive OR-ing, at least one bit position input of said result shift register;
 e. serially presenting result output bits from said result shift register to said plurality of binary storage elements for constituting therein a further test signal pattern;
 f. repeating steps b, c, d, and e for a predetermined number of times;
 g. verifying the contents of said result shift register with a predetermined test result pattern.

* * * * *

UNITED STATES PATENT AND TRADEMARK OFFICE
CERTIFICATE OF CORRECTION

PATENT NO. : 4,435,806
DATED : March 6, 1984
INVENTOR(S) : MARINUS T.M. SEGERS ET AL It is certified that error appears in the above-identified patent and that said Letters Patent is hereby corrected as shown below:

```
Claim 4, line 20, after"OR-ing" delete ","(comma);
after "at" insert --at--.
```

Signed and Sealed this

Twenty-second Day of May 1984

[SEAL]

Attest:

GERALD J. MOSSINGHOFF

Attesting Officer

Commissioner of Patents and Trademarks